United States Patent [19]

Mersich

[11] 3,974,344

[45] Aug. 10, 1976

[54] ELECTRONIC SPEECH CIRCUIT FOR A CENTRAL BATTERY TELEPHONE SET

[75] Inventor: Laszlo Mersich, Tyreso, Sweden

[73] Assignee: Telefonaktiebolaget L M Ericsson, Stockholm, Sweden

[22] Filed: Feb. 13, 1975

[21] Appl. No.: 549,664

[30] Foreign Application Priority Data

Mar. 5, 1974 Sweden............................ 7402901

[52] U.S. Cl............................179/81 A; 179/170 NC
[51] Int. Cl.²........................................ H04M 1/58
[58] Field of Search.............. 179/81 R, 81 A, 81 B, 179/170 NC, 170.2

[56] References Cited
UNITED STATES PATENTS

| | | | |
|---|---|---|---|
| 3,462,560 | 8/1969 | Holzman............................ | 179/81 A |
| 3,742,153 | 6/1973 | Matsuda............................ | 179/81 A |
| 3,748,400 | 7/1973 | Ritz................................... | 179/81 A |

*Primary Examiner*—Kathleen H. Claffy
*Assistant Examiner*—Joseph A. Popek
*Attorney, Agent, or Firm*—Hane, Baxley & Spiecens

[57] ABSTRACT

An electronic speech circuit for a central battery telephone set in the form of a Wheatstone bridge has for one arm of the bridge the impedance of the incoming line to the set and for another arm an impedance mainly equal to the line impedance. The remaining arms consist of resistance impedances, preferably resistors. The DC-terminals of the transmitter amplifier are connected in the bridge diagonal which is connected between the two resistors, and the other bridge diagonal is formed by the signal path of the receiver amplifier, the DC-terminals of which are connected to one of the resistors and to the line simulating impedance.

4 Claims, 3 Drawing Figures

ELECTRONIC SPEECH CIRCUIT FOR A CENTRAL BATTERY TELEPHONE SET

The present invention relates to an electronic speech circuit for a central battery set. More specifically, the invention relates to such a speech circuit which is designed as a Wheatstone bridge to obtain a favourable value of the sidetone attenuation of the set.

The amplifiers included in the above type of set for the amplification of speech currents require a DC-supply, for which reason the set together with other sets is connected to a common battery in the telephone exchange (central battery supply). In this connection a maximum distance between the set and the exchange is defined which is determined by the highest allowable line resistance between the units which resistance with the exception of the line length, also is determined by the line resistance per km. For values of the line resistance which approach the maximum permitted (about 1200 ohm) it is important that the resistance of the set, i.e. total resistance of the set between the line terminals of the microphone amplifier and receiving amplifier, is not to high. The reason for this requirement is that the desired DC-supply to the set amplifiers could be obtained in spite of great line lengths and because the line relay included in the exchange demands certain current for its operation.

The existing line between the set and the exchange, furthermore, shows a certain frequency dependent attenuation due to its capacitive character. Thus speech signals with a high frequency, for example, 3000 Hz will be more attenuated than signals with a lower frequency, for example, 300 Hz. The attenuation for the different signal frequencies will be greater the longer the line is. In order to obtain a constant signal level in the transmitter and the receiver side upon transmitting, signals having the higher frequency must be amplified more than signals having the lower frequency. The relationships will be analogous upon receiving, i.e., receiving signals having high frequency must be amplified more than signals having low frequency.

It is previously known to design the speech circuit as a Wheatstone bridge to the obtain optimal value of the sidetone attenuation, i.e. the attenuation value for which the outgoing speech currents from the microphone amplifier of the set do not have disturbing influence on its loudspeaker telephone. In such a previously known circuit, the DC-terminals of the receiver amplifier are connected directly to the line terminals of the speech circuits so that sufficient DC-voltage is obtained for long terminal lines between the set and exchange. A drawback with this connection is that a choke coil must be connected in series with the receiver amplifier to block the self-transmitted signal going back to the receiver amplifier. Another drawback with the known connection is that the DC-voltage drop across the set consists of partly the DC-voltage drop across the microphone amplifier and the DC-voltage drop across a bridge resistor, thus there is at least one diode voltage drop and the voltage drop across a resistor. It is further a drawback to connect diodes in the DC-path of a bridge arm because the impedance value of a diode varies with the DC-current through the same and may cause unbalance of the bridge for different line lengths.

An object of the present invention is to avoid the above mentioned drawbacks in speech circuits previously known and to obtain a speech circuit which presents as little resistance as possible for the incoming DC-voltage and which at the same time gives an optimal value of the sidetone attenuation.

Another object of the present invention is to provide an electronic speech circuit which shows a constant signal level for transmission and reception, the transmitting and receiving signal being independent of the frequency distorsion in the line attenuation.

The invention, the characteristics of which appear in the appended claims, will be described more fully in connection with the accompanying drawings in which:

Figure 1:
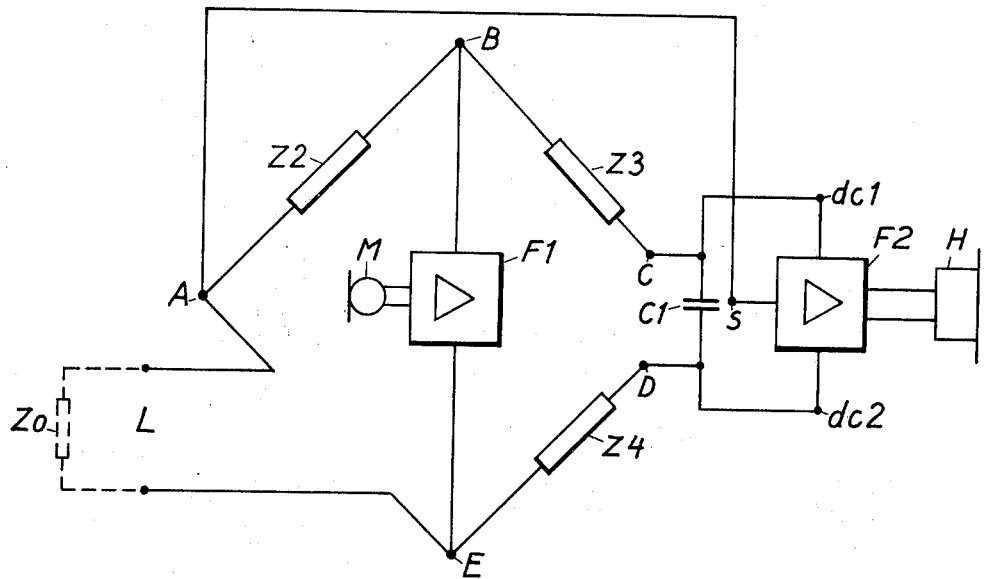
FIG. 1 shows schematically a diagram of the speech circuit according to the present invention.

In FIG. 1 a speech circuit of the balanced Wheatstone bridge type is schematically indicated. The incoming line L to the speech circuit is connected to the bridge at the points A and E, its characteristic impedance $Zo$ forming the impedance in a bridge arm. With $Z2$ and $Z3$ two impedances are designated each of which constitutes an arm in the bridge. These impedances are in the present speech circuit chosen as pure resistances with low value, preferably about 20 ohm. The remaining arm in the bridge consists of the impedance $Z4$ which consists of a resistor-capacitor connection and which intends to simulate the line impedance $Zo$. In this manner the balance condition for the bridge $Zo/Z4 = Z2/Z3$ can be fulfilled and an optimal sidetone attenuation can be obtained.

In one of the bridge diagonals between the points B and E the outputs of the microphone amplifier F1 are connected, and to both the inputs of the amplifier the microphone M is connected. The output impedance of the amplifier F1 is chosen high. The microphone circuit is known per se for which reason it has not been shown more closely. The receiver amplifier of the set is designated with F2 and its DC-voltage terminals are designated $dc1$, $dc2$, the telephone receiver H being connected to one of the terminals $dc1$. According to the idea of the invention both the DC-voltage terminals $dc1$ and $dc2$ of the receiver amplifier are connected so that one of them, $dc1$, is via the impedances $Z2$ and $Z3$ connected to one of the line terminals A and the other, $dc2$, is connected via the impedance $Z4$ to the other line terminal E. In this manner the receiver amplifier F2 will be series supplied with the supply DC-voltage coming from the line. The signal input of the amplifier F2 is connected directly to one of the line terminals A. An incoming signal current flows in the following way: Point A, point $s$ to the amplifier F2 and via the impedance $Z4$ to point E. Furthermore, according to the principle of the invention, a capacitor C1 of relatively high capacitance has been connected between the points C and D to serve as decoupling for the outgoing signal from the set. Consequently the microphone signals will be decoupled and a choke coil to block them from amplifier F2 is not necessary. The capacitor C1 has in addition the function of providing a time limited monitoring of tone signalling in the manner that charge energy is stored therein, which keeps a certain supply voltage to the receiver amplifier during a short time interval.

Figure 2:
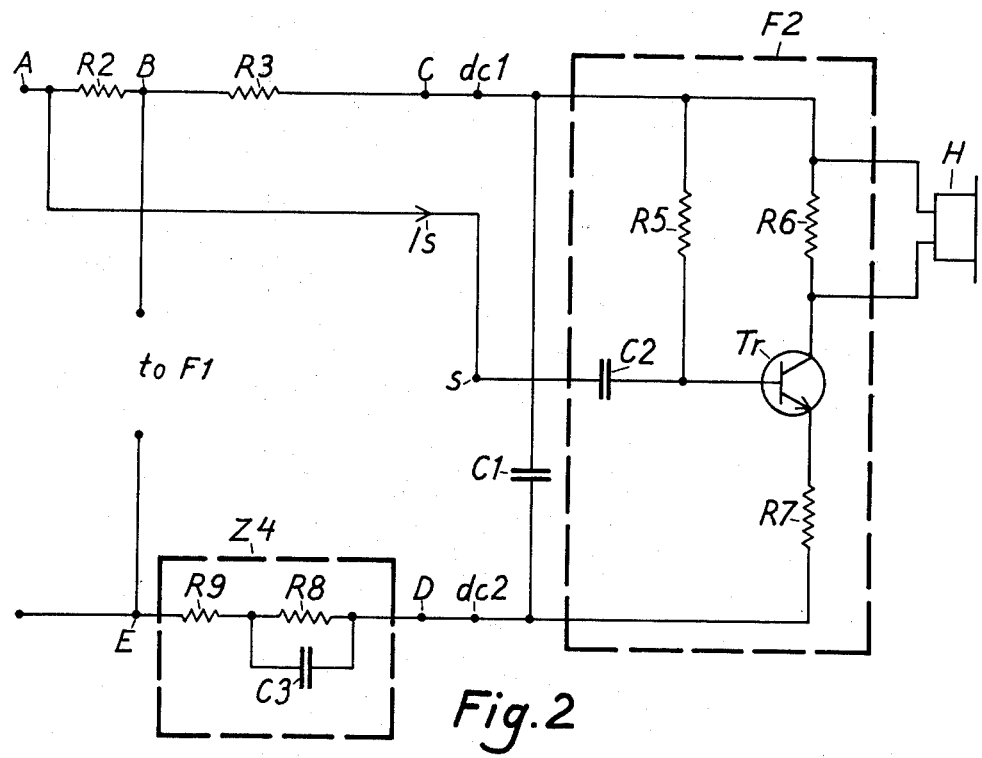
FIG. 2 shows a circuit diagram of the receiver amplifier and its connection to other elements in the speech circuit according to the invention.

In FIG. 2 a detailed embodiment of the circuit and receiver amplifier F2 is shown. This consists in the shown embodiment of a transistor stage consisting of the transistor Tr the associated emitter resistor R7, and as a load the telephone receiver H. The base resistor R5 has the purpose of providing a suitable operating point for the transistor Tr. The resistor R6 is connected across the input terminals of the telephone receiver H for the compensation of its frequency depending impedance. The signal input s of the amplifier is via the coupling capacitor C2 connected to the base of the transistor Tr, the capacitor blocking the DC-current component IDC of the line current coming to the terminal A. Across the DC-inputs dc1, dc2 of the amplifier, i.e. between the points C and D, the above mentioned capacitor C1 is connected, its capacitance being chosen high so that sufficient decoupling of the outgoing signals from the set is obtained. In this manner it is achieved that the point C as regards signals is equivalent with the point D. The resistors R2 and R3 correspond to the bridge impedances Z2 and Z3 according to FIG. 1 which according to the above have been chosen resistive. Because the point C as regards signals is equivalent to the point D, a signal voltage drop will occur across the base-emitter circuit of the transistor, the input of which constitutes the input of the amplifier, and an amplified signal voltage occurs across the input of the telephone receiver H, FIG. 1. The signal path shown in FIG. 2 from point A through resistors R2 and R3 to the point C and via the capacitor C1 to point D and via the impedance Z4 to the line terminal E is quite independent of the impedance of the telephone receiver H and the balance condition of the bridge is dependent only on the values of elements R2, R3 and Z4, Zo. The impedance Z4 consists of the resistor R9 in series with the parallel-connection of the resistor R8 and the capacitor C3 to simulate the line impedance Zo, whereby the bridge balance is obtained.

Figure 3:
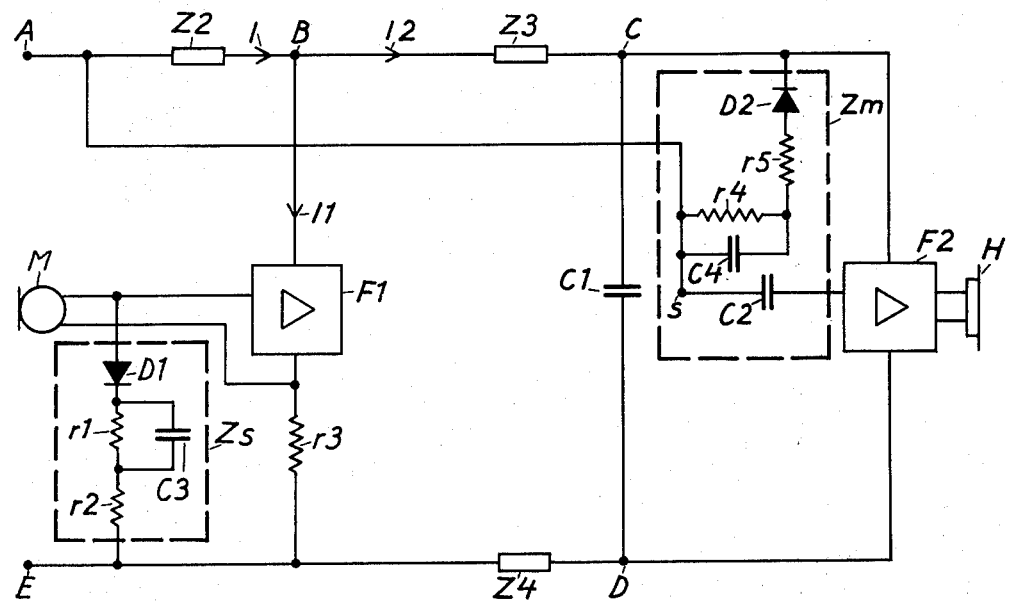
FIG. 3 shows an embodiment of the speech circuit according to the present invention which contains circuits for automatic level control.

FIG. 3 shows schematically a diagram of an electronic speech circuit according to the present invention which contains circuits for automatic level control. The speech circuit is formed by a Wheatstone bridge having bridge impedances Z2, Z3 and Z4, where the impedances Z2 and Z3 preferably consist of pure resistors. The incoming line which is connected to the points A and E in the bridge has a characteristic impedance Zo. The impedances Z2, Z3 and Z4 are in known manner dimensioned so that bridge balance is obtained. The transmitter and receiver side of the speech circuit have been loaded with variable impedances Zs and Zm, respectively, the values of which are controlled by means of the line direct current. The impedance Zs consists of a frequency independent part comprising the diode D1 in series with the resistors r1 and r2 which are connected to a resistor r3 in the direct current path of the amplifier F1. Across the resistor r1 a capacitor C3 is connected and forms together with this resistor the frequency dependent part of the load impedance Zs. The impedance Zm consists of a frequency independent part comprising the diode D2 in series with the resistors r4 and r5, the series connection being connected to the signal input s of the loudspeaker amplifier F2, i.e. in parallel with the impedances Z2 and Z3. The frequency dependent part of the load impedance Zm is formed by the capacitor C4 connected in parallel with the resistors r4.

In the transmitter side, the direct current I1 to the microphone amplifier F1 of the set gives rise to a direct voltage drop across the resistor r3 which via the small microphone resistance biases the diode D1. This has as known a non-linear current-voltage characteristic, its impedance being high for low values of its bias voltage and low for high values of its bias voltage. At low line lengths, the direct current I1 is high (small line impedance), whereby the bias voltage is high and the load impedance consisting of the diode D1 and the resistor r1 is low. This implies that the signal voltage to the microphone amplifier F1 is highly attenuated. For long line lengths, on the contrary, the direct current I1 is low (high line impedance) and the impedance of the diode is high, for which reason the signal voltage will be less attenuated.

By the connection of the capacitor C3, also, a frequency dependent attenuation of the microphone signal can be obtained. The load impedance contains a frequency dependent factor $$\left[\frac{r2^2}{1 + \omega^2 r2^2 C3^2}\right]^{1/2}$$

which gives a frequency dependent contribution to the attenuation. For low line length the frequency dependent factor dominates, for the impedance of the diode is small implying that signals having a high frequency are more attenuated than those having a low frequency. For great line length the relationship will be the contrary, because then the impedance of the diode D1 is high and dominates over the frequency dependent factor in the load impedance Zs. The resistance value of the resistor r2 then determines the magnitude of the control range.

The frequency dependent and the frequency independent control of the receiving level by means of the load impedance Zm takes place principally in the same manner as by means of the load impedance Zs. The diode D2 and the resistors r4, r5 represent a variable load whose impedance of which is controlled by the bias voltage across the impedances Z2 and Z3. For low line length (high value of the direct currents I and I2) the bias voltage is high (Z2 and Z3 pure resistive) and the load impedance Zm is low, i.e. high attenuation of the incoming signal to the amplifier F2. For great line length, on the contrary, the impedance of the diode D2 is high and the attenuation of the incoming signal is low. Like in the transmitter side, a frequency dependent factor in the load impedance Zm can be arranged by connecting the capacitor C4 in parallel with the resistor r4.

The proposed speech circuit is well suited for hybrid manufacture whereby an integrated circuit can be obtained which easily can be adapted to different requirements with small tolerances and high power endurance. By using high-grade integration the volume of the circuit can be made small which makes it suitable and insensitive to mechanical influence.

We claim:

1. An electronic speech circuit for a central battery telephone set including a transmitter having a pair of DC-terminals for operating currents and a receiver amplifier having a pair of DC-terminals for operating current and a signal input terminal, said circuit comprising first and second input terminals adapted to be connected to a telephone line having a known impedance, first and second resistors connected in series, said first and second resistors each having a free end, the free end of said first resistor being connected to said first input terminal, a first impedor having a first end connected to said second input terminal and a second end, the impedance of said first impedor simulating the known impedance of the telephone line, means for connecting the DC-terminals of the transmitter amplifier between the junction of said first and second resistors and said second input terminal, means for connecting the DC-terminals of the receiver amplifier between the free end of said second resistor and the second end of said impedor, and means for connecting the signal input terminal of the receiver amplifier to one of said input terminals adapted to be connected to the telephone line.

2. A speech circuit as claimed in claim 1 further comprising a capacitor having a high capacitance connected across the pair of DC-terminals of the receiver amplifier for decoupling of the signal component in the line current entering the speech circuit.

3. A speech circuit as claimed in claim 1 further comprising a variable impedor at the input of the transmitter amplifier and a variable impedor at the input of the receiver amplifier, the impedance value of each such variable impedor being dependent on the value of the line direct current to the respective amplifier, whereby an attenuation of the input signal to the respective amplifier is obtained.

4. A speech circuit as claimed in claim 3, wherein said variable impedors each comprise a non-linear impedance element connected in series with a resistor-capacitor combination.

* * * * *